US 6,578,969 B1

(12) United States Patent
Hinsching et al.

(10) Patent No.: US 6,578,969 B1
(45) Date of Patent: Jun. 17, 2003

(54) ARRANGEMENT FOR CUTTING OFF RADIATION IN PROJECTORS AND/OR ILLUMINATION DEVICES

(75) Inventors: Hagen Hinsching, Ossmaritz (DE); Ralf Hasse, Milda (DE); Rolf Roeder, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/607,645

(22) Filed: Jun. 30, 2000

(30) Foreign Application Priority Data

Jul. 1, 1999 (DE) .......................... 199 30 815

(51) Int. Cl.[7] ....................... G03B 21/14; G03B 21/22; G03B 21/00; G03B 15/02; F21V 21/26
(52) U.S. Cl. ............................. 353/97; 353/46; 353/49; 353/97; 353/101; 353/122; 362/3; 362/18; 362/257; 362/269; 362/282; 362/285
(58) Field of Search ................. 362/3, 6, 18, 84, 362/257, 269, 282, 285; 353/46, 49, 119, 122, 100, 101, 97

(56) References Cited

U.S. PATENT DOCUMENTS

| 4,917,487 A | * | 4/1990 | Cruickshank | ................. 353/28 |
| 5,128,838 A | * | 7/1992 | Brandess | ..................... 362/18 |
| 5,400,514 A | * | 3/1995 | Imbrie et al. | ................. 33/286 |
| 6,079,835 A | * | 6/2000 | Yu | .............................. 353/119 |
| 6,286,760 B1 | * | 9/2001 | Schmidt et al. | ........ 235/462.32 |
| 6,315,435 B1 | * | 11/2001 | Hamilton et al. | ........... 362/476 |
| 6,412,972 B1 | * | 7/2002 | Pujol et al. | .................. 362/272 |
| 2002/0143506 A1 | * | 10/2002 | D'Aligny et al. | ............... 703/6 |

FOREIGN PATENT DOCUMENTS

| DE | 34 47 316 C1 | 2/1986 | ........... G02B/26/00 |
| DE | 295 19 257 U1 | 3/1996 | ........... A61F/9/007 |
| DE | 195 64 623 C1 | 6/1997 | ........... G02B/26/02 |

OTHER PUBLICATIONS

English Abstract DE 195 64 623 C1.
Brief Summary of DE 295 19 257 U1.

* cited by examiner

Primary Examiner—Russell Adams
Assistant Examiner—Melissa J Koval
(74) Attorney, Agent, or Firm—Reed Smith LLP

(57) ABSTRACT

An arrangement is disclosed for cutting off intensive radiation in projectors and/or illumination devices whose projection head, which projects the light, is mounted in a receptacle or holder rotatable about an azimuth axis so as to be swivelable about an additional axis arranged vertical to the azimuth axis. It comprises a cutoff mechanism which comprises a coupling member, and light-absorbing means or cutoff means, which is fixedly connected with the receptacle and which is rotatable jointly with the latter and with the projection head about the azimuth axis, wherein the light-absorbing or cutoff means are positioned in the cutoff position in front of the light outlet opening of the projection head or of an objective or in an intermediate image plane located within the projection head. The arrangement is suitable for application particularly with projection of image contents on plane, arched, or curved projection surfaces.

12 Claims, 3 Drawing Sheets

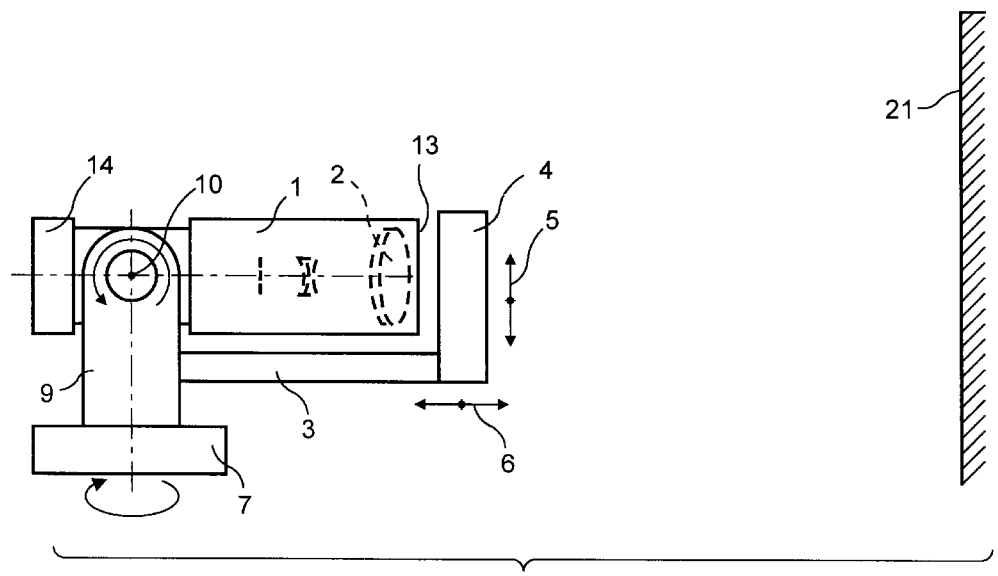
F I G. 5
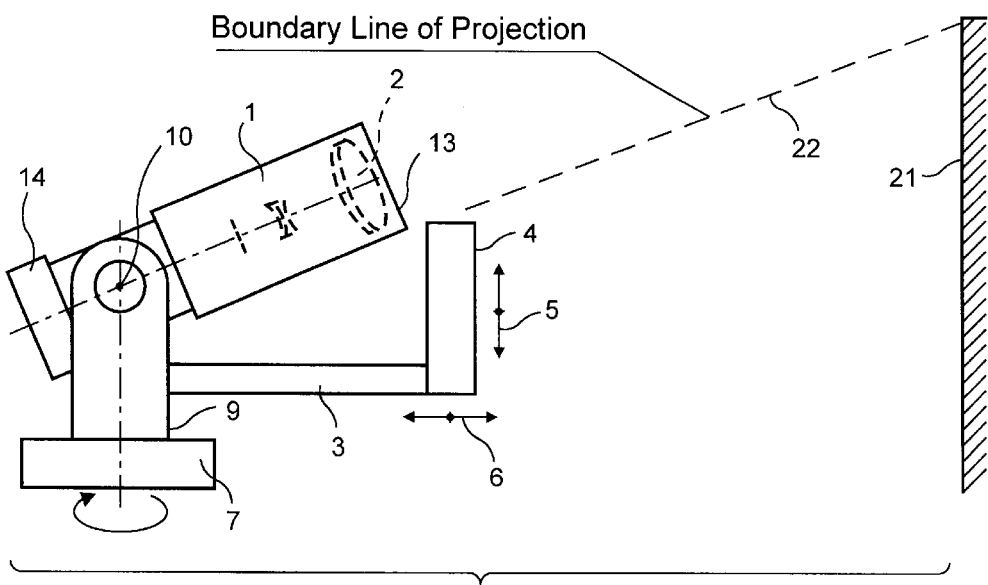
F I G. 6

ARRANGEMENT FOR CUTTING OFF RADIATION IN PROJECTORS AND/OR ILLUMINATION DEVICES

BACKGROUND OF THE INVENTION a) Field of the Invention

The invention is directed to an arrangement for cutting off radiation in projectors and/or illumination devices, particularly when projecting image contents on plane and curved projection surfaces.

b) Description of the Related Art

Laser projectors which can be set up at different locations, especially those using variable focus objective lenses for projecting image contents, and illumination devices require a suitable safety device which ensures, independent from any measurement, control or regulating technology, that the standing area for persons which is defined as the safety zone can not be reached under any circumstances by laser radiation or other intensive light radiation. Such a device is particularly necessary when the projector cannot be installed from the start at a corresponding height above the surface accessible to persons. The lasers to be used with an average power over all emitted wavelengths of $\geqq 3$ W belong to laser class 4. Although the intensity of the laser radiation decreases with increasing distance, the permissible limit values of the maximum permissible irradiation according to EN60825-1:1997 and DIN 56912:1982 at a distance of 10 m are clearly exceeded. ANSI standard Z136.1-1993 and FDA regulation 21 CFR1040 are determining for use in the U.S.A.

According to these standards currently in force, a safe distance above the floor of 3 m (U.S.A.) and 2.5 m (Europe) must be maintained in supervised projectors. Often, this cannot be realized for technical reasons, among others, and is also often not sensible. The arrangement described hereinafter can be applied for projection of image contents on spherical surfaces of all types such as the inner surfaces of domes as well as in any other arrangements for illumination and for projection on plane, cylindrical or otherwise curved surfaces.

OBJECT AND SUMMARY OF THE INVENTION

Therefore, it is the primary object of the invention to provide an arrangement for cutting off radiation in projectors and/or illumination devices which ensures, independent from any measurement, control or regulating technology, that the standing area for persons which is defined as the safety zone can not be reached or struck under any circumstances by the radiation being used.

According to the invention, this object is met by an arrangement for cutting off intensive radiation in projectors and/or illumination devices whose projection head, which projects the light, is mounted in a receptacle or holder rotatable about an azimuth axis so as to be swivelable about an additional axis arranged vertical to the azimuth axis. It comprises a cutoff mechanism which comprises a coupling member and light-absorbing means or cutoff means, which is fixedly connected with the receptacle and which is rotatable jointly with the latter and with the projection head about the azimuth axis, wherein the light-absorbing or cutoff means are positioned in the cutoff position in front of the light outlet opening of the projection head or of an objective or in an intermediate image plane located within the projection head. The arrangement is suitable for application particularly with projection of image contents on plane, arched, or curved projection surfaces in the first patent claim. Modifications and details of the invention are indicated in the further claims.

Accordingly, it is advantageous when the entire cutoff mechanism is swivelable about the additional axis extending perpendicularly to the azimuth axis.

In order to control the movement of the entire cutoff mechanism about the additional axis relative to the projection head depending on its movement or angular position, loaded transmission members are provided between the cutoff mechanism and the projection head. Accordingly, it is possible to provide a disk cam or other transmission gear unit by means of which various fast angular movements of the cutoff mechanism and projection head are realized. It must only be ensured that the light-absorbing and light-stopping means of the cutoff mechanism completely interrupt the light when the projection head has reached an angular position in which the light exiting from it can radiate into the above mentioned safety zone for persons.

In order to be able to adjust the light-stopping or light-absorbing means of the cutoff mechanism in an optimum manner, the latter can be adjusted in the direction of the optical axis of the projection head and/or in a plane perpendicular to this optical axis.

The light-absorbing means of the cutoff mechanism are advantageously constructed as a light trap which has a honeycomb structure or formed of light-absorbing material.

It is also possible to provide the light-absorbing means of the cutoff mechanism with a light-absorbing surface coating and/or surface structure.

Since heat is generated in most cases when eliminating light by cutting off or light absorption, it is advantageous when the light-absorbing means of the cutoff mechanism have means for dissipating or regulating heat. For example, cooling ribs, known per se, or other surface-enlarging elements can be provided at the light-absorbing means. It is also possible to cool the heated structural component parts by means of a flow of coolant; however, this requires a greater expenditure on apparatus.

The described arrangement realizes a cutoff mechanism which is fixedly connected with the movement of the projection head or of an objective about an azimuth axis and which serves as a light trap. This cutoff mechanism is guided along with every movement of the projection head or objective above the plane of projection by means of a rigid coupling with the projection head and is accordingly always located in the direction of projection (azimuthal movement). The second movement axis, said additional axis, of the projection head or projector about which a vertical swiveling is realized can be controlled in any manner. The cutoff mechanism begins to operate without any additional controlling when the projection head could project into the safety zone, irrespective of the radiation angle adjusted at a variable focus lens or at another optical projection system. While the projection area can vary somewhat, the system can be adjusted in every case in such a way that projection or irradiation never occurs in the safety zone even in an unfavorable position of the projection head.

Scatter light which may occur must be below the dangerous limiting values.

The system can be adjusted for different geometric conditions, but is fixed with respect to application. The cutoff means can be constructed as a plane, curved or arched plate.

Compulsory adjustment of the penetration or immersion position of the objective of the projection head can also be realized, for example, when using an elevator system for the entire projection head or illumination device that is used. For this purpose, the change in setup geometry, e.g., by elevating the setup location above a standard position, is used in order to automatically expand the projection area of the projector, but without projecting in the intended safety zone. By means of fixed mechanical coupling of the vertical adjusting means of the projection head to the adjusting means of the cutoff mechanism, the latter adjustment remains effective irrespective of any control in any position of the arrangement in the azimuth plane.

The arrangement according to the invention is fully functional for horizontal as well as inclined setup of the projection head or illumination device. The inclination of the azimuth axis also characterizes the inclination of the projection head and, therefore, also the inclination of the cutoff mechanism and, therefore, also the inclination of the safety zone. Accordingly, the arrangement according to the invention is also suitable for application, for example, for projecting image contents in inclined domes.

The invention will be described more fully in the following with reference to an embodiment example shown in the accompanying drawings.

BRIEF DESCRIPTION OF THE DRAWINGS in the drawings

FIG. 5 shows a projection head in cutoff position; and

FIG. 6 shows the projection head in the projection position.

DESCRIPTION OF THE PREFERRED EMBODIMENTS

Parts and groups of components having identical construction or function are provided with identical reference numbers in FIGS. 1 to 6.

Figure 1:
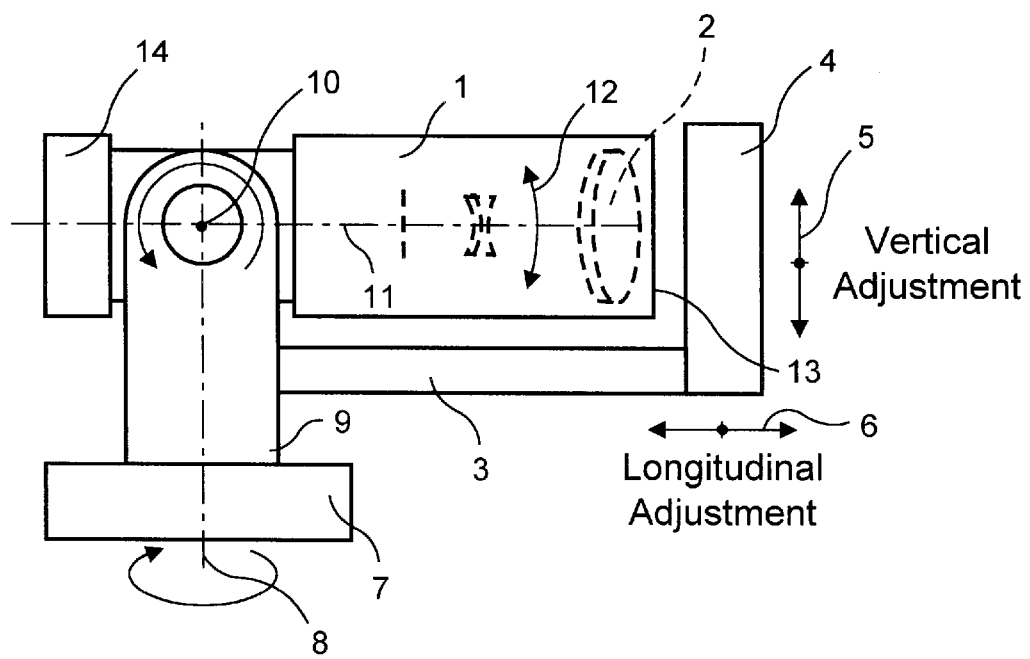
FIG. 1 is a side view showing a projection head with cutoff mechanism located in front of the light outlet opening.
Figure 2:
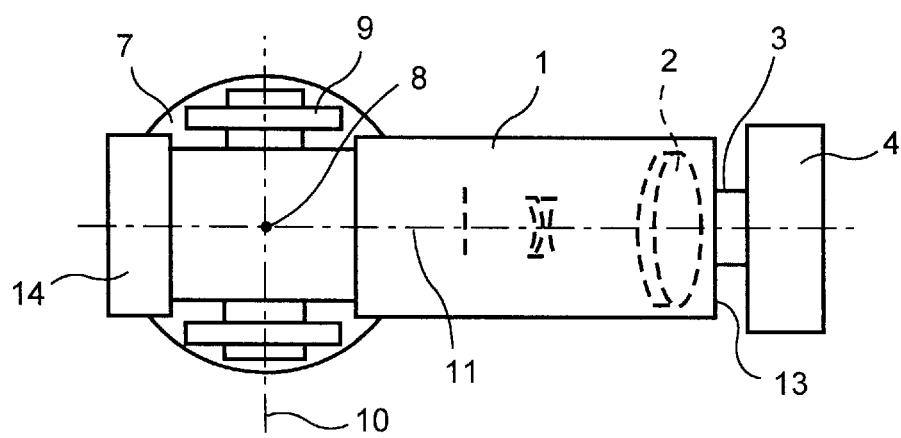
FIG. 2 is a top view showing a projection head with cutoff mechanism according to FIG. 1.

FIGS. 1 and 2 show different views of a projection head 1 with an objective 2 in which the cutoff mechanism is arranged in front of the light outlet opening of the projection head 1. The cutoff mechanism includes one or more coupling members 3 and light-absorbing or light-stopping means 4 (hereinafter: deflecting means) which are arranged at the coupling member 3 and can preferably be adjusted vertically and longitudinally (shown by double arrows in FIG. 1). The projection head 1 is mounted in or on a stand 9 so as to be swivelable vertically about an additional axis 10 extending perpendicularly to an azimuth axis 8, the stand 9 being arranged so as to be rotatable on a base 7 around the azimuth axis 8.

The coupling member 3 is fastened to the stand 9 in such a way that it an only be moved together with the projection head 1 and synchronized with the latter about the azimuth axis 8. Thus, the coupling member 3 always lies in the plane formed by the azimuth axis 8 and the optical axis 11 of the projection head 1.

In the arrangement according to the invention shown in FIGS. 1 and 2, the coupling member 3 is rigidly connected with the stand 9, while the projection head 1 is swivelable vertically as is illustrated by arrow 12 in FIG. 1. FIG. 1 shows the cutoff position, i.e., in the projection direction, the cutoff means 4 conceal the light outlet opening 13 of the projection head 1 or an illumination device, so that no light can enter a prescribed or intended protected area, e.g., spectator or guest space.

The arrangement directly in front of the outlet opening of the objective ensures full effectiveness in any position of the projection head 1. The solution can be realized in a simple manner mechanically. The surface (structure) of the cutoff means 4, e.g., an appropriately structured and/or surface-treated, plane, curved or arched plate, of the cutoff mechanism should be constructed so as to be correspondingly large so that all radiation is absorbed or cut off at the distance to be realized at the largest radiation angle when the projection head 1 occupies a position such that light can penetrate into the protected area.

The cutoff area of the arrangement can be adjusted corresponding to the protected area in the guest space by the adjustability of means 4 at the coupling member 3 in the direction of the optical axis 11 (arrow 5) and perpendicular thereto (arrow 6), so that all light, including possible scattered light, is cut off or absorbed when the projection head has assumed its position in the cutoff position.

An image-generating system is designated by 14 in FIGS. 1 and 2, this system or its image contents being projected through the objective 1 on an arched or plane projection surface, not shown.

Figure 3:
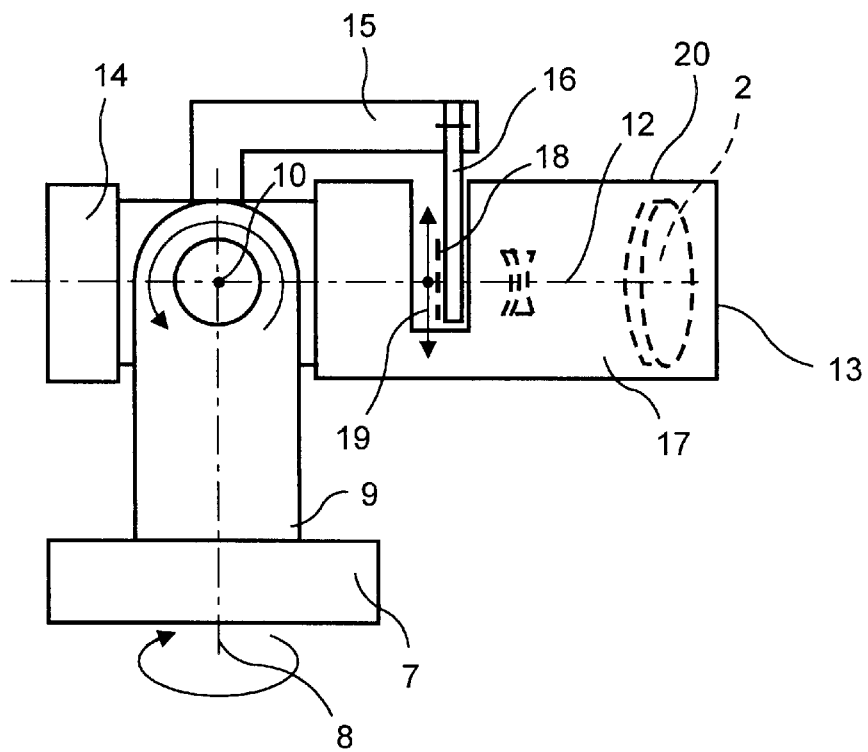
FIG. 3 is a aside view showing a projection head with cutoff mechanism located in an intermediate image plane.
Figure 4:
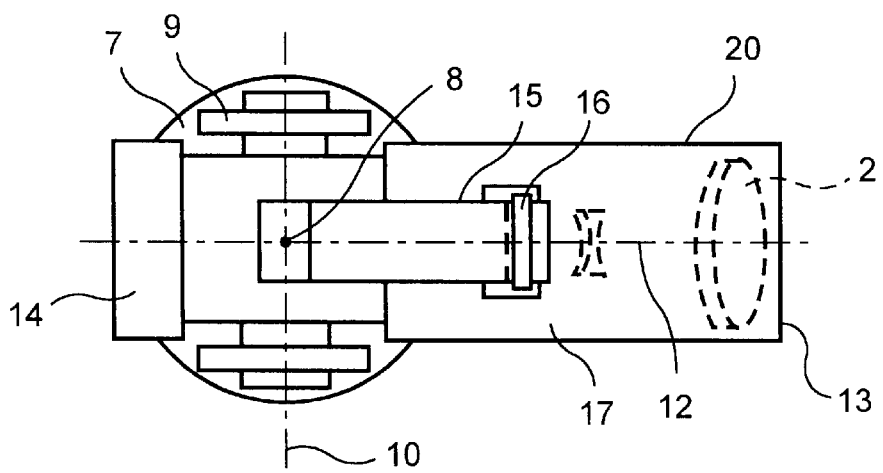
FIG. 4 is a top view of a projection head according to FIG. 3.

FIGS. 3 and 4 show various views of a projection head 17 with a cutoff mechanism which includes the coupling member 15 and cutoff means 16 which are arranged fixedly at the latter. As in the arrangement according to FIGS. 1 and 2, the coupling member 15 lies in a plane formed by the azimuth axis 8 and the optical axis 12 and is fixedly connected with the projection head 17 in such a way that a rotation, about the azimuth axis 8 can only be carried out jointly with this projection head 17. In the cutoff position which is shown in FIGS. 3 and 4, the cutoff means 16 project S into the housing 20 of the projection head 17 and accordingly cut off or interrupt the beam path. For this purpose, the means 16 advantageously act so as to interrupt the beam at the location of a possible intermediate image, that is, in an intermediate image plane 18.

The swiveling movement of the cutoff mechanism comprising the coupling member 15 and means 16 and the additional axis 10 are illustrated by the arrow 19.

When the cutoff mechanism is arranged in the interior of the projection head 17, for example, in or in the vicinity of the intermediate image plane 18, the cutoff means 16 can have reduced dimensions. The cutoff means can swivel upward out of the housing 20 through an image field rotation of 180°, as is shown in FIG. 3, in order to release the radiation through the light outlet opening 13 from the projection head. For this purpose, it is necessary to provide additional transmission members (not shown) between the projection head 17 and the coupling member 15 of the cutoff mechanism, which additional transmission members make it possible to control the movement of the entire cutoff mechanism about the additional axis 10 relative to the projection head 17 depending on its movement or angular position.

For example, disk cams or other suitable transmission members converting angular velocities or angular movements can be provided as suitable transmission members which generate different angular velocities or angular movements between the projection head 17 and cutoff mechanism during the vertical swiveling of these structural component parts. Accordingly, it is necessary for proper functioning of the arrangement shown in FIGS. 3 and 4 that when the projection head 17 is moved at a determined angular velocity or angular movement the cutoff mechanism must be moved at a greater angular velocity or angular movement, so that a safe and reliable cutting off or absorption is carried out when light could penetrate into the area to be protected, and a corresponding transmission of light is realized in the opposite case.

In FIG. 5, the projection head 1 is in the cutoff position, i.e., all light is cut off and cannot reach the protected area 21 represented by the shaded area in the drawing.

FIG. 6 shows the projection head 1 in a projection position, namely, in a position such that the boundary line 22 for projection is barely reached. As can be seen from this Figure, the light which could penetrate into the protected area below this boundary line 22 is effectively cut off by the upper edge of the cutoff means 4. Harmful intensive radiation is prevented from penetrating into the protected area.

When adjusting the cutoff mechanism in relation to the projection head 1 and 17, it must also be taken into account that the image expansion (enlargement of the radiation angle) is not automatically detected with variable focus objectives. In this case, either a correction mechanism is installed which is fixedly coupled to the variable focus optics and which correspondingly corrects the position of the cutoff mechanism, or the adjustment of the system must be carried out for the largest radiation angle so as to guarantee that the safety zone is not irradiated.

The use of the arrangement according to the invention is also useful for fixed focal length objectives with movable projection head, particularly with regard to portable devices which can be set up at different locations and must be adjusted for different safety conditions and requirements. This is possible by means of simple adjustments without the need to adapt regulators and end positions.

The apparent image of the shadow boundary in the projection can be influenced by corresponding shaping of the edge of the cutoff means 4; 16 of the cutoff mechanism, e.g., to linearize the shadow boundary for spherical projection in domes on the horizon or in the vicinity thereof.

While the foregoing description and drawings represent the present invention, it will be obvious to those skilled in the art that various changes may be made therein without departing from the true spirit and scope of the present inventions.

What is claimed is:

1. An arrangement for cutting off radiation in projectors or illumination devices comprising:
    a projection head, which projects the light, being mounted in a receptacle or holder rotatable about an azimuth axis so as to be swivelable about an additional axis arranged perpendicular to the azimuth axis;
    a cutoff mechanism which comprises a coupling member and light-absorbing means or cutoff means, being fixedly connected with the receptacle and being rotatable jointly with the latter and with the projection head about the azimuth axis;
    said light-absorbing or cutoff means being positioned in the cutoff position in front of a light outlet opening of the projection head or of an objective or in an intermediate image plane located within the projection head.

2. The arrangement according to claim 1 wherein the entire cutoff mechanism is fixedly connected with the receptacle and is swiveled about the azimuth axis only jointly with the receptacle and projection head.

3. The arrangement according to claim 2, wherein the entire cutoff mechanism is adjustable relative to the projection head about the additional axis in a controlled manner.

4. The arrangement according to claim 1, wherein light-absorbing or cutoff means is adjustable in the direction of the optical axis of the projection head or in a plane perpendicular to the optical axis.

5. The arrangement according to claim 1, wherein the light-absorbing means of the cutoff mechanism are constructed as a cutoff mechanism having a honeycomb structure or formed of light-absorbing material.

6. The arrangement according to claim 1, wherein the light-absorbing means of the cutoff mechanism have means for carrying off heat or regulating heat.

7. The arrangement according to claim 1, wherein the light-absorbing means of the cutoff mechanism are provided with a light-absorbing surface coating or surface structure, or both.

8. An arrangement for cutting off laser radiation in a projector that projects images, the arrangement comprising:
    a receptacle;
    a projection head mounted in the receptacle and operable to project images using a laser radiation, the projection head being rotatable about an azimuth axis and swivelable about a second axis arranged perpendicularly to the azimuth axis;
    a cutoff mechanism including a coupling member and a light stopper coupled to the coupling member, the coupling member being fixedly connected with the receptacle and being rotatable jointly with the light stopper about the azimuth axis;
    the light stopper stopping the laser radiation from being projected when the projection head swivels about the second axis past a predetermined boundary line.

9. The arrangement according to claim 8 wherein the light stopper is adjustable in the direction of the optical axis of the projection head or is adjustable in a plane perpendicular to the optical axis.

10. The arrangement according to claim 8 wherein the light stopper of the cut off mechanism comprises a honeycomb structure or light-absorbing material.

11. The arrangement according to claim 8 wherein the light stopper of the cutoff mechanism comprises a light-absorbing surface coating or light-absorbing surface structure.

12. The arrangement according to claim 11 Wherein the light stopper comprises a surface enlarging element to dissipate heat generated from the stopped laser light.

* * * * *